United States Patent
Kim (10) Patent No.: US 9,886,623 B2
(45) Date of Patent: Feb. 6, 2018

(54) USER INTENTION ANALYSIS APPARATUS AND METHOD BASED ON IMAGE INFORMATION OF THREE-DIMENSIONAL SPACE

(71) Applicant: Electronics and Telecommunications Research Institute, Daejeon (KR)

(72) Inventor: Jin Woo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 15/092,726

(22) Filed: Apr. 7, 2016

(65) Prior Publication Data

US 2016/0335485 A1 Nov. 17, 2016

(30) Foreign Application Priority Data

May 13, 2015 (KR) .......................... 10-2015-0066506

(51) Int. Cl.
*G06K 9/00* (2006.01)
*G06K 9/66* (2006.01)
(Continued)

(52) U.S. Cl.
CPC ..... *G06K 9/00335* (2013.01); *G06K 9/00845* (2013.01); *G06K 9/6202* (2013.01);
(Continued)

(58) Field of Classification Search
CPC ......... G06T 17/00; G06T 13/40; G06T 19/00; G06T 2207/10028; G06T 2200/04;
(Continued)

(56) References Cited

U.S. PATENT DOCUMENTS 8,786,576 B2 7/2014 Jung et al.
9,383,895 B1 * 7/2016 Vinayak .................. G06F 3/017
(Continued)

FOREIGN PATENT DOCUMENTS

KR 10-2009-0093220 9/2009
KR 10-2011-0078560 7/2011
(Continued)

*Primary Examiner* — Jingge Wu
(74) *Attorney, Agent, or Firm* — Kile Park Reed & Houtteman PLLC (57) ABSTRACT

Provided are a user intention analysis apparatus and method based on image information of a three-dimensional (3D) space. The user intention analysis apparatus includes a 3D space generator configured to generate a 3D virtual space corresponding to an ambient environment, based on physical relative positions of a plurality of cameras and image information generated by photographing the ambient environment with the plurality of cameras, a 3D image analyzer configured to estimate a relative position between a first object and a second object included in the image information in the 3D virtual space and generate contact information of the first object and the second object, based on the relative positions of the first object and the second object, an action pattern recognizer configured to compare the contact information with a pre-learned action pattern to recognize an action pattern of a user who manipulates the first object or the second object, and a user intention recognizer configured to infer a user intention corresponding to the recognized action pattern, based on ontology.

17 Claims, 7 Drawing Sheets

(51) Int. Cl.
*G06K 9/62* (2006.01)
*G06T 17/00* (2006.01)

(52) U.S. Cl.
CPC ............... *G06K 9/66* (2013.01); *G06T 17/00* (2013.01); *G06T 2200/08* (2013.01)

(58) Field of Classification Search
CPC ...... G06T 2207/30268; G06K 9/00201; G06K 9/00335; G06K 2209/40; G06K 9/00355; G06K 9/00845; G06K 9/6202; G06K 9/6211; G06K 9/06
See application file for complete search history.

(56) References Cited

U.S. PATENT DOCUMENTS

| | | | |
|---|---|---|---|
| 2002/0186216 A1* | 12/2002 | Baumberg | G06T 17/10 345/422 |
| 2008/0037875 A1* | 2/2008 | Kim | G06K 9/00335 382/199 |
| 2010/0030578 A1* | 2/2010 | Siddique | G06Q 10/0637 705/3 |
| 2010/0103106 A1* | 4/2010 | Chui | G06F 3/017 345/166 |
| 2011/0260965 A1* | 10/2011 | Kim | G06F 3/013 345/156 |
| 2011/0293144 A1* | 12/2011 | Rahardja | A63F 13/10 382/103 |
| 2012/0281002 A1* | 11/2012 | Ward | G06T 15/30 345/501 |
| 2012/0327125 A1* | 12/2012 | Kutliroff | G06F 3/017 345/660 |
| 2013/0027393 A1* | 1/2013 | Fujiwara | G06T 15/20 345/419 |
| 2013/0074002 A1* | 3/2013 | Markovic | G06F 3/017 715/781 |
| 2013/0120360 A1* | 5/2013 | Hsu | G06F 3/011 345/419 |
| 2013/0265220 A1* | 10/2013 | Fleischmann | G06F 3/011 345/156 |
| 2013/0314421 A1* | 11/2013 | Kim | G09B 5/065 345/427 |
| 2014/0015831 A1 | 1/2014 | Kim et al. | |
| 2014/0184494 A1* | 7/2014 | Burachas | G06F 3/012 345/156 |
| 2014/0254919 A1 | 9/2014 | Sun et al. | |
| 2014/0257532 A1 | 9/2014 | Kim et al. | |
| 2014/0291523 A1 | 10/2014 | Kwon et al. | |
| 2015/0185857 A1* | 7/2015 | Jung | G06F 3/0304 345/156 |
| 2015/0277700 A1* | 10/2015 | He | G06F 3/0325 715/852 |
| 2016/0156771 A1* | 6/2016 | Lee | G06K 9/00288 455/414.1 |
| 2016/0232708 A1* | 8/2016 | Kim | G06K 9/00201 |
| 2017/0075427 A1* | 3/2017 | Kim | G06F 3/013 |

FOREIGN PATENT DOCUMENTS

| | | |
|---|---|---|
| KR | 10-1082829 | 11/2011 |
| KR | 10-2012-0049062 | 5/2012 |
| KR | 10-1250619 | 4/2013 |
| KR | 10-2014-0109790 | 9/2014 |
| KR | 10-2014-0112316 | 9/2014 |

* cited by examiner

USER INTENTION ANALYSIS APPARATUS AND METHOD BASED ON IMAGE INFORMATION OF THREE-DIMENSIONAL SPACE

CROSS-REFERENCE TO RELATED APPLICATIONS

This application claims priority under 35 U.S.C. §119 to Korean Patent Application No. 10-2015-0066506, filed on May 13, 2015, the disclosure of which is incorporated herein by reference in its entirety.

TECHNICAL FIELD

The present invention relates to a user intention analysis apparatus and method based on image information of a three-dimensional (3D) space, and more particularly, to a user intention analysis apparatus and method, which analyze an interaction between a hand and a head of a user recognized from a 3D virtual space reconstructing the real world to recognize a user intention.

BACKGROUND

A related art driver monitoring system for vehicles focuses on analyzing the face expression of a driver or analyzing the blink or blink period and pattern of eyes to analyze the drowsiness, distraction, and emotion of the driver.

Moreover, in order to realize augmented reality (AR) for vehicles, research is being done for tracing an eye-gaze of a driver to augment a 3D object and recognizing a posture and motion of the driver to manipulate a vehicle user interface (UI).

Global vehicle companies such as BMW, AUDI, BenZ, GM, Continental, and Denso have secured a human machine interface user experience (HMI UX) combined with a vehicle multimodal interface for recognizing a voice, a touch, and a motion and have reached a commercialization stage.

However, it is difficult to accurately analyze an intention of a driver by using only motion and face expression recognition technology based on unidirectionality. Also, motion recognition technologies have a problem where calibration should be performed for each of drivers.

SUMMARY

Accordingly, the present invention provides an analysis apparatus and an analysis method, which accurately recognize an intention of a user, based on contact/noncontact information obtained by analyzing a relative position relationship between body parts of one person in a 3D space reconstructing the real world.

The object of the present invention is not limited to the aforesaid, but other objects not described herein will be clearly understood by those skilled in the art from descriptions below.

In one general aspect, a user intention analysis apparatus based on image information of a three-dimensional (3D) space includes: a 3D space generator configured to generate a 3D virtual space corresponding to an ambient environment, based on physical relative positions of a plurality of cameras and image information generated by photographing the ambient environment with the plurality of cameras; a 3D image analyzer configured to estimate a relative position between a first object and a second object included in the image information in the 3D virtual space and generate contact information of the first object and the second object, based on the relative positions of the first object and the second object; an action pattern recognizer configured to compare the contact information with a pre-learned action pattern to recognize an action pattern of a user who manipulates the first object or the second object; and a user intention recognizer configured to infer a user intention corresponding to the recognized action pattern, based on ontology.

The 3D image generator may generate a 3D virtual space corresponding to a 3D space where a voxel of a 3D space generated by a first camera which photographs the ambient environment in a first direction intersects a voxel of a 3D space generated by a second camera which photographs the ambient environment in a second direction.

The 3D image analyzer may estimate 3D positions of the first object and the second object to detect a first feature point and a second feature point, which is to be used as landmarks, from the first object and the second object and may match the first feature point and the second feature point with a 3D model obtained by modeling the first object and the second object.

The 3D image analyzer may trace positions of a 3D model of the first object and a 3D model of the second object obtained by matching the first feature point with the second feature point to generate contact information of the first object and the second object.

The 3D image analyzer may assign an identifier (ID) to an arbitrary point or region of each of the 3D model of the first object and the 3D model of the second object obtained by matching the first feature point with the second feature point, and may generate n-dimensional contact information which includes IDs of corresponding nodes and information about whether the arbitrary point or region (hereinafter referred to as a node) to which the ID is assigned contacts other nodes.

The 3D image analyzer may compare a predetermined threshold distance with a distance between nodes to generate contact information of the nodes which is classified into contact, adjacency, and noncontact.

The 3D image analyzer may include: a first sensing unit configured to generate first sensing information about an object, based on image information which is obtained by photographing the ambient environment in a first direction; a second sensing unit configured to generate second sensing information about the object, based on image information which is obtained by photographing the ambient environment in a second direction; a first scanner configured to generate first scan data corresponding to the first object; a second scanner configured to generate second scan data corresponding to the second object; a first matcher configured to match the first scan data with a feature point which is detected by combining the first and second sensing information and is used as a landmark in the first object; a second matcher configured to match the second scan data with a feature point which is detected by combining the first and second sensing information and is used as a landmark in the second object; and a contact determiner configured to generate contact information of a 3D model of the first object, which is output as a matched result from the first matcher, and a 3D model of the second object which is output as a matched result from the second matcher.

The action pattern recognizer may include: a user experience storage configured to store a learned user action pattern; an action pattern analyzer configured to classify the learned user action pattern from an n-dimensional vector included in the contact information; and an action pattern output unit configured to recognize and output the classified action pattern as a user action pattern corresponding to the contact information.

The user intention recognizer may include: a user experience analyzer configured to store information obtained by analyzing a correlation between a user action pattern and a user intention, based on ontology; a user intention determiner configured to determine a user intention corresponding to the user action pattern recognized by the action pattern recognizer, based on the correlation between the user action pattern and the user intention analyzed by the user experience analyzer; and a user experience learner configured to learn the correlation between the user intention determined by the user intention determiner and the user action pattern recognized by the action pattern recognizer and transfer a learned result to the user experience analyzer.

In another general aspect, a user intention analysis method based on image information of a three-dimensional (3D) space includes: generating a 3D virtual space corresponding to an ambient environment, based on physical relative positions of a plurality of cameras and image information generated by photographing the ambient environment with the plurality of cameras; estimating a relative position between a first object and a second object included in the image information in the 3D virtual space to generate contact information of the first object and the second object, based on the relative positions of the first object and the second object; comparing the contact information with a pre-learned action pattern to recognize an action pattern of a user who manipulates the first object or the second object; and inferring a user intention corresponding to the recognized action pattern, based on ontology.

The generating of the 3D virtual space may include generating a 3D virtual space corresponding to a 3D space where a voxel of a 3D space generated by a first camera which photographs the ambient environment in a first direction intersects a voxel of a 3D space generated by a second camera which photographs the ambient environment in a second direction.

The generating of the contact information may include estimating 3D positions of the first object and the second object to detect a first feature point and a second feature point, which is to be used as landmarks, from the first object and the second object and matching the first feature point and the second feature point with a 3D model obtained by modeling the first object and the second object.

The generating of the contact information may include tracing positions of a 3D model of the first object and a 3D model of the second object obtained by matching the first feature point with the second feature point to generate contact information of the first object and the second object.

The generating of the contact information may include assigning an identifier (ID) to an arbitrary point or region of each of the 3D model of the first object and the 3D model of the second object obtained by matching the first feature point with the second feature point, and generating n-dimensional contact information which includes IDs of corresponding nodes and information about whether the arbitrary point or region (hereinafter referred to as a node) to which the ID is assigned contacts other nodes.

The generating of the contact information may include comparing a predetermined threshold distance with a distance between nodes to generate contact information of the nodes which is classified into contact, adjacency, and non-contact.

The generating of the contact information may include: (a) generating first sensing information about an object, based on image information which is obtained by photographing the ambient environment in a first direction; (b) generating second sensing information about the object, based on image information which is obtained by photographing the ambient environment in a second direction; (c) generating first scan data corresponding to the first object; (d) generating second scan data corresponding to the second object; (e) matching the first scan data with a feature point which is detected by combining the first and second sensing information and is used as a landmark in the first object; (f) matching the second scan data with a feature point which is detected by combining the first and second sensing information and is used as a landmark in the second object; and (g) generating contact information of a 3D model of the first object, which is output as a result obtained by matching the first scan data with the feature point detected from the first object, and a 3D model of the second object which is output as a result obtained by matching the second scan data with the feature point detected from the second object.

Step (g) may include: assigning an identifier (ID) to an arbitrary point or region of each of the 3D model of the first object and the 3D model of the second object obtained by matching the first feature point with the second feature point; and generating n-dimensional contact information which includes IDs of corresponding nodes and information about whether the arbitrary point or region (hereinafter referred to as a node) to which the ID is assigned contacts other nodes.

The recognizing of the action pattern may include: classifying a learned user action pattern from an n-dimensional vector included in the contact information; and recognizing and outputting the classified action pattern as a user action pattern corresponding to the contact information.

The inferring may include: storing information obtained by analyzing a correlation between a user action pattern and a user intention, based on ontology; determining a user intention corresponding to the recognized user action pattern, based on the correlation between the user action pattern and the user intention; and learning the correlation between the determined user intention and the recognized user action pattern.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 1:
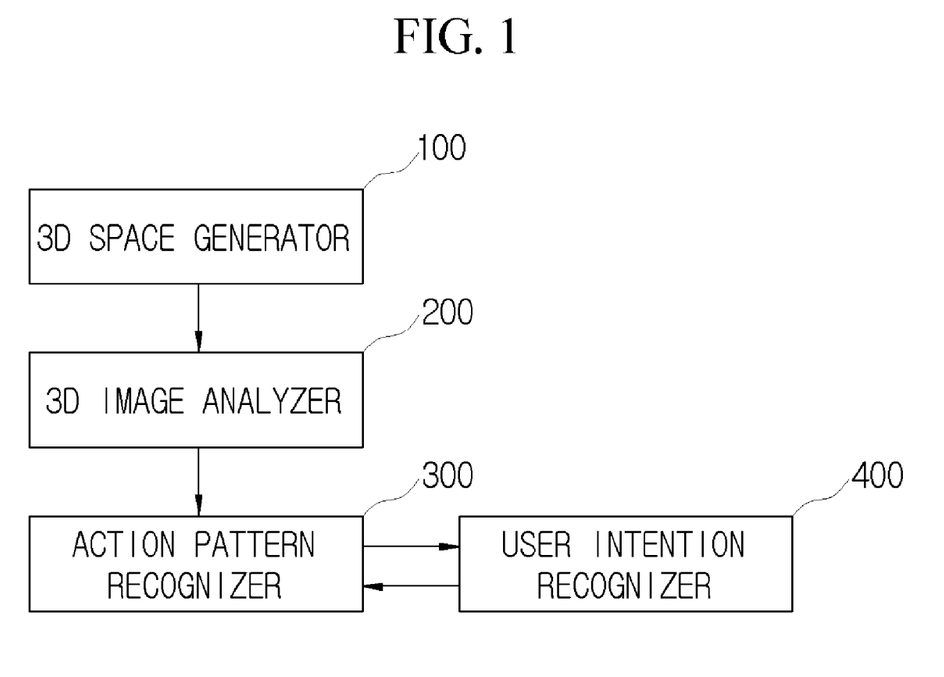
FIG. 1 is a block diagram illustrating a user intention analysis apparatus based on image information of a 3D space, according to an embodiment of the present invention.

FIG. 1 is a block diagram illustrating a user intention analysis apparatus based on image information of a 3D space, according to an embodiment of the present invention.

Referring to FIG. 1, the user intention analysis apparatus based on image information of a 3D space according to an embodiment of the present invention may include a 3D space generator 100, a 3D image analyzer 200, an action pattern recognizer 300, and a user intention recognizer 400.

The 3D space generator 100 may generate a 3D virtual space corresponding to an ambient environment, based on physical relative positions of a plurality of cameras and image information generated by the cameras photographing the ambient environment.

In this case, the 3D space generator 100 may receive image information which is generated by photographing an ambient environment of a specific space with a camera. Here, the camera may be a color camera or a depth camera.

Hereinafter, a method where the 3D space generator 100 generates a 3D virtual space corresponding to an ambient environment will be described with reference to FIG. 2.

Figure 2:
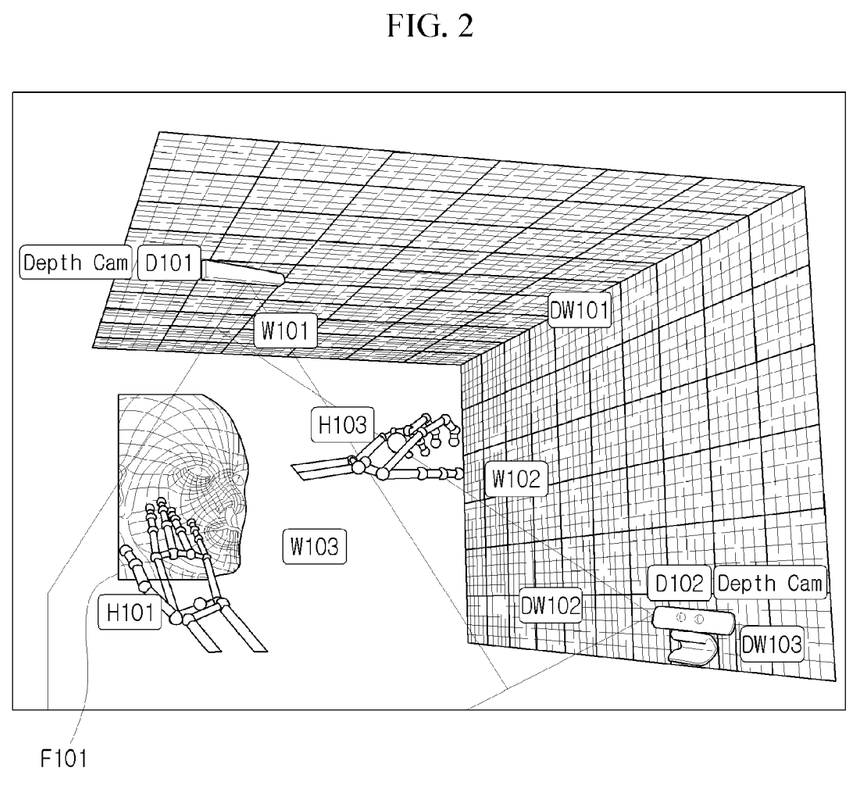
FIG. 2 is a conceptual diagram illustrating a relative position relationship between objects in a 3D virtual space generated by a 3D space generator illustrated in FIG. 1.

FIG. 2 is a conceptual diagram illustrating a relative position relationship between objects in a 3D virtual space generated by the 3D space generator 100 illustrated in FIG. 1.

Referring to FIG. 2, an example where a plurality of depth cameras D101 and D102 are disposed at certain positions in a specific space and a plurality of devices DW101 to DW103 which are used as landmarks for generating a 3D virtual space are disposed at certain positions is illustrated.

For example, when it is assumed that the specific space is the inside of a vehicle, the plurality of devices DW101 to DW103 used as the landmarks may be a room mirror, a side mirror, and a navigation device.

Physical relative positions of the depth cameras D101 and D102 and the devices DW101 to DW103 may be previously known.

The 3D space generator 100 may generate a virtual 3D coordinate system, based on the previously known physical relative positions of the depth cameras D101 and D102 and the devices DW101 to DW103 used as the landmarks.

Here, the depth cameras D101 and D102 may be installed at physically different positions to generate image information which are captured in different directions and correspond to an ambient environment.

For example, the depth camera D101 may be installed on a vehicle ceiling to generate image information W101 which is obtained by photographing a portion above a head of a driver, and the depth camera D102 may be installed on a dash board or in a cluster to generate image information W102 which is obtained by photographing the front of the driver.

The 3D space generator 100 may generate, on a 3D virtual coordinate system, a 3D virtual space corresponding to a 3D space W103 where a voxel of the 3D image information W101 generated by the depth camera D101 intersects a voxel of the 3D image information W102 generated by the depth camera D102.

That is, the 3D space generator 100 may restore a relative position from position information of each of voxels respectively generated by the depth cameras D101 and D102 to generate a 3D virtual space corresponding to the 3D space W103. In this case, relative position information of objects in the 3D virtual space may be determined.

The 3D image analyzer 200 may estimate relative positions of a first object and a second object included in the image information in the 3D virtual space and may generate contact information of the first object and the second object, based on the relative positions of the first object and the second object.

The 3D image analyzer 200 may estimate 3D positions of the first object and the second object in the 3D virtual space generated by the 3D space generator 100 to detect a first feature point and a second feature point, which is to be used as landmarks, from the first object and the second object and may match the first feature point and the second feature point with a 3D model obtained by modeling the first object and the second object.

Moreover, the 3D image analyzer 200 may trace positions of a 3D model of the first object and a 3D model of the second object which are obtained by matching the first feature point with the second feature point, thereby generating contact information of the first object and the second object.

For example, the 3D image analyzer 200 may assign an identifier (ID) to an arbitrary point or region of each of the 3D model of the first object and the 3D model of the second object which are obtained by matching the first feature point with the second feature point, and may generate n-dimensional contact information which includes IDs of corresponding nodes and information about whether the arbitrary point or region (hereinafter referred to as a node) to which the ID is assigned contacts other nodes.

In this case, the 3D image analyzer 200 may compare a predetermined threshold distance with a distance between nodes to generate contact information of the nodes which is classified into contact, adjacency, and noncontact.

For example, when it is assumed that the 3D virtual space is obtained by restoring an ambient environment of the inside of a vehicle, the first object and the second object may be a head/face and a hand/finger of a driver. Hereinafter, for convenience of description, an example where the 3D virtual space is assumed as being obtained by restoring an ambient environment of the inside of a vehicle and contact information is generated from an image obtained by photographing an ambient environment of the inside of a vehicle depending on a position relationship between a head/face and a hand/finger of a driver will be described.

Figure 3:
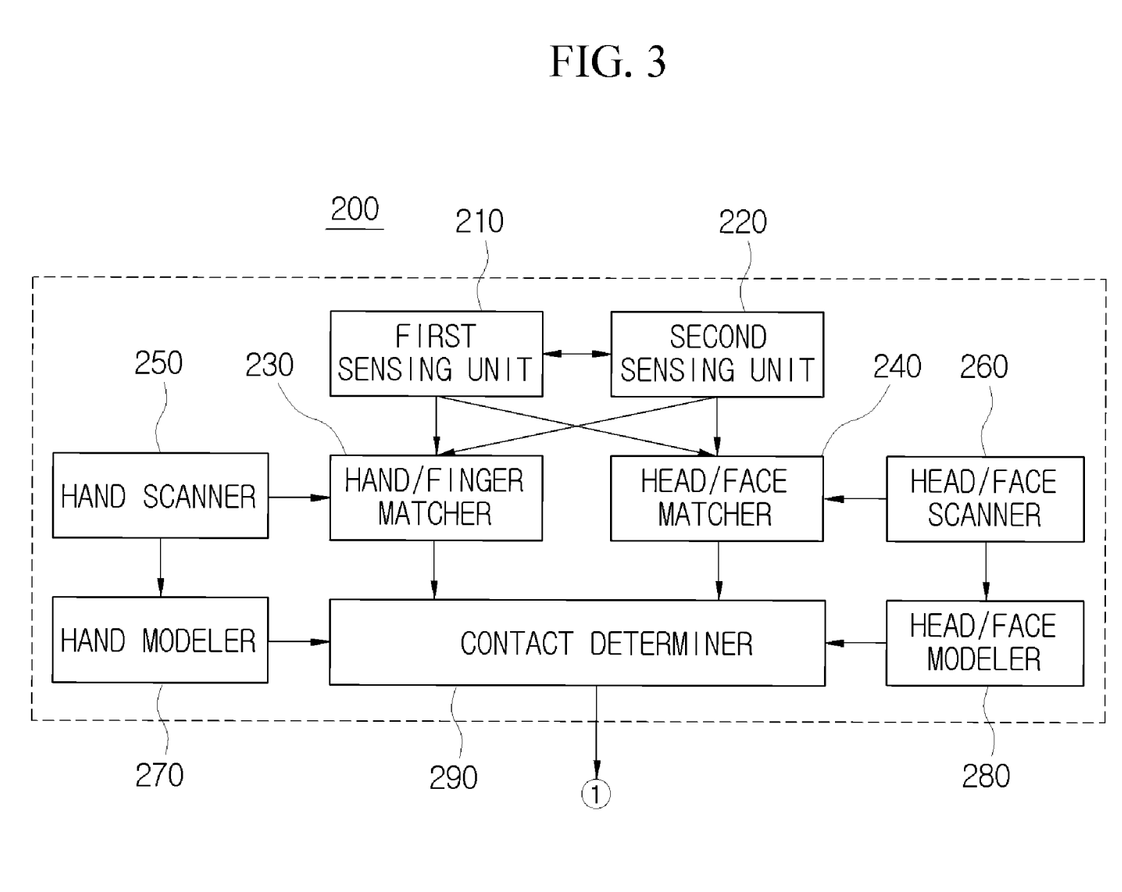
FIG. 3 is a block diagram illustrating a configuration of a 3D image analyzer illustrated in FIG. 1.

FIG. 3 is a block diagram illustrating a configuration of the 3D image analyzer 200 illustrated in FIG. 1.

Referring to FIG. 3, the 3D image analyzer 200 may include a first sensing unit 210, a second sensing unit 220, a hand/finger matcher 230, a head/face matcher 240, a hand scanner 250, a head/face scanner 260, a hand modeler 270, a head/face modeler 280, and a contact determiner 290.

The first sensing unit 210 may generate first sensing information about an object, based on image information which is obtained by photographing an ambient environment of the inside of a vehicle in a first direction. For example, the first sensing unit 210 may compare pre-learned data with driver head-on data to detect the driver head-on data, based on image information about an ambient environment photographed by a depth camera installed on a vehicle ceiling and may estimate a position of the detected head-on data in a 3D virtual space.

The second sensing unit 220 may generate second sensing information about the object, based on image information which is obtained by photographing an ambient environment of the inside of the vehicle in a second direction. For example, the second sensing unit 220 may compare the pre-learned data with driver face front data to detect the driver face front data, based on image information obtained by photographing the front of the driver with a camera installed in a cluster of the vehicle and may estimate a position of the detected face front data in the 3D virtual space.

In this case, the driver head-on data detected and the position estimated by the first sensing unit 210 and the driver face front data detected and the position estimated by the second sensing unit 220 may be shared in real time.

Therefore, even when a face of a driver is occluded by a hand and/or the like, a layer of the hand and a layer of a face may be distinguished, and thus, a position of the face and a position of the hand may be independently estimated from a position of each of cameras.

The hand scanner 250 may generate 3D scan data corresponding to a hand/finger region of the driver located in the vehicle.

The head/face scanner 260 may generate 3D scan data corresponding to a face/head region of the driver located in the vehicle. In this case, the hand scanner 250 and the head/face scanner 260 may each be configured with a plurality of sensor arrays for generating 3D scan data. Here, the sensor may use an ultrasound sensor.

The hand/finger matcher 230 may match a feature point, which is used as a landmark in the hand/finger of the driver detected by combining the first and second sensing information, with the 3D scan data which is detected by the hand scanner 250 and corresponds to the hand/finger region. In this case, a position of the hand/finger of the driver may be estimated for each of frames in real time.

The head/face matcher 240 may match a feature point, which is used as a landmark in the head/face detected by combining the first and second sensing information, with the 3D scan data which is detected by the head/face scanner 260 and corresponds to the head/face. In this case, a position of the head/face of the driver may be estimated for each of frames in real time.

The contact determiner 290 may determine, recognize, and estimate a portion, where the hand of the driver contacts a face surface, in a 3D virtual space in real time.

Figure 4:
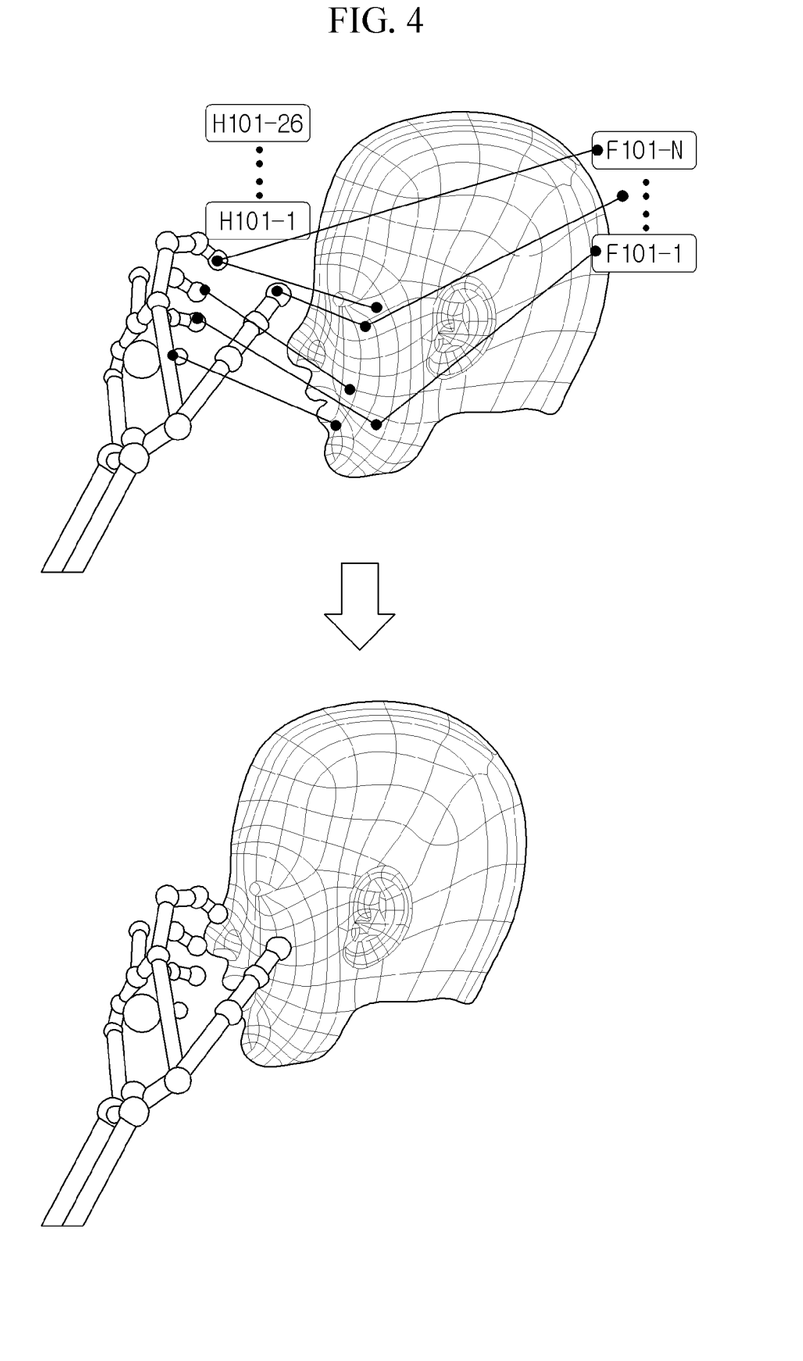
FIG. 4 is a conceptual diagram for describing a method of determining whether a face/head surface of a user contacts a finger of the user, according to an embodiment of the present invention.

Hereinafter, a method of determining whether a face/head surface of a driver contacts a finger of the driver, according to an embodiment of the present invention, will be described with reference to FIG. 4. FIG. 4 exemplarily illustrates a method of determining whether a face/head surface of a user contacts a finger of the user, according to an embodiment of the present invention.

The hand modeler 270 may model a hand/finger of a driver, based on scan data obtained by the hand scanner 250 and may assign an ID to an arbitrary point or region in a 3D model of the hand/finger.

The head/face modeler 280 may model a head/face of the driver, based on scan data obtained by the head/face scanner 260 and may assign an ID to an arbitrary point or region in a 3D model of the head/face.

Referring to FIG. 4, it is illustrated that an ID is assigned to each of twenty-six partial regions H101-1 to H101-26 of a finger joint or surface of the driver and an ID is assigned to each of N partial regions F101-1 to F101-N of a 3D head surface.

The contact determiner 290 may generate n-dimensional contact information which includes IDs of corresponding nodes and information about whether an arbitrary point or region (hereinafter referred to as a node) to which an ID is assigned contacts other nodes.

In this case, the 3D image analyzer 200 may compare a predetermined threshold distance with a distance between nodes to generate contact information of the nodes which is classified into contact, adjacency, and noncontact.

For example, information about whether a portion of a hand contacts a portion of a face may be classified into stages such as contact, adjacency, and noncontact and may be stored in a packet when a distance between one point of each of the nodes and a point closest thereto is less than a predetermined specific value.

In detail, a distance D-HF between the partial region H101-1 and the partial region F101-1 may be classified into various stages such as contact "D-HF<d", adjacency "d<D-HF<d'", noncontact "D-HF>d'", . . . , and the like in association with a specific distance (d, d'), and contact information may be generated.

The action pattern recognizer 300 may compare the contact information with a pre-learned action pattern to recognize an action pattern of the user who manipulates the first object or the second object.

Figure 5:
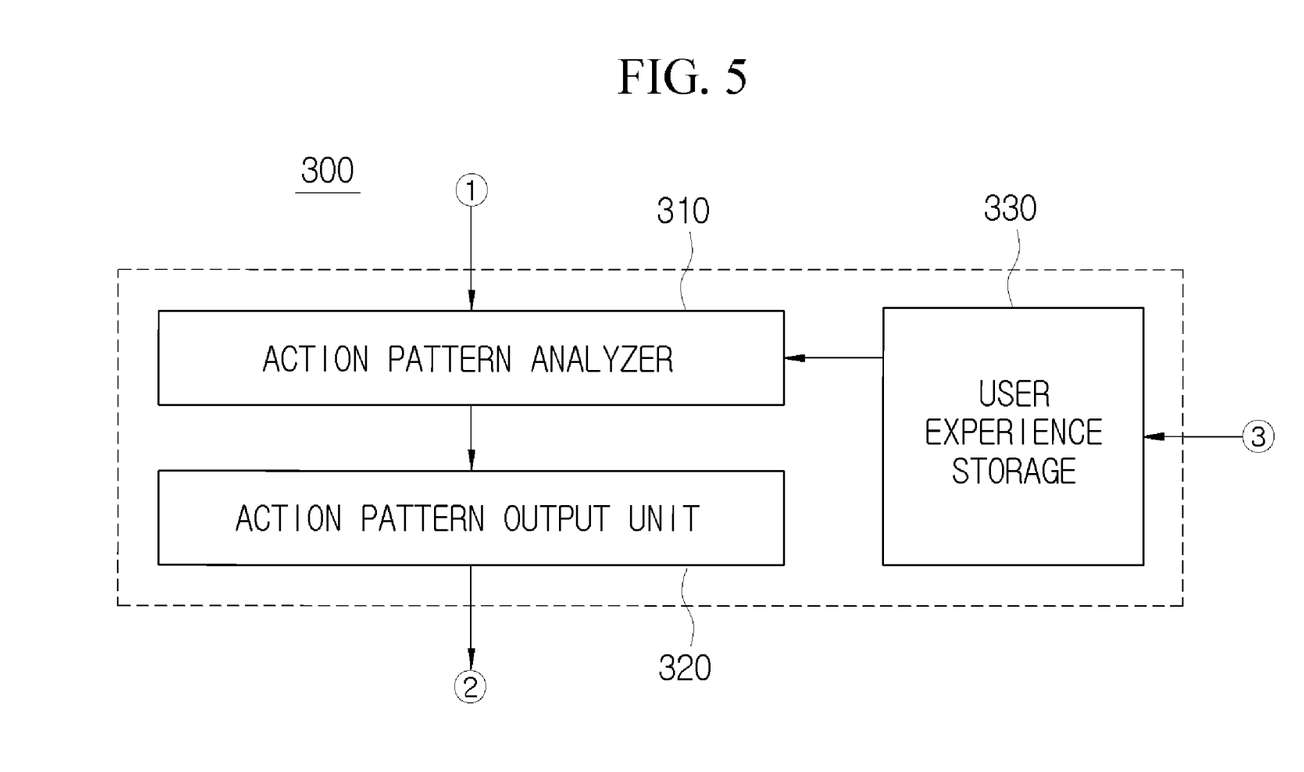
FIG. 5 is a block diagram illustrating a configuration of an action pattern recognizer illustrated in FIG. 1.

FIG. 5 is a block diagram illustrating a configuration of the action pattern recognizer 300 illustrated in FIG. 1.

Referring to FIG. 5, the action pattern recognizer 300 may include an action pattern analyzer 310, an action pattern output unit 320, and a user experience storage 330.

The action pattern analyzer 310 may classify a learned user action pattern from an n-dimensional vector included in contact information.

The action pattern output unit 320 may recognize and output the classified action pattern as a user action pattern corresponding to the contact information.

The user experience storage 330 may store the learned user action pattern. In this case, the learned user action pattern may be transferred from the user intention recognizer 400 to be described below and may be stored in the user experience storage 330.

The user intention recognizer 400 may infer a user intention corresponding to the recognized action pattern, based on ontology.

Figure 6:
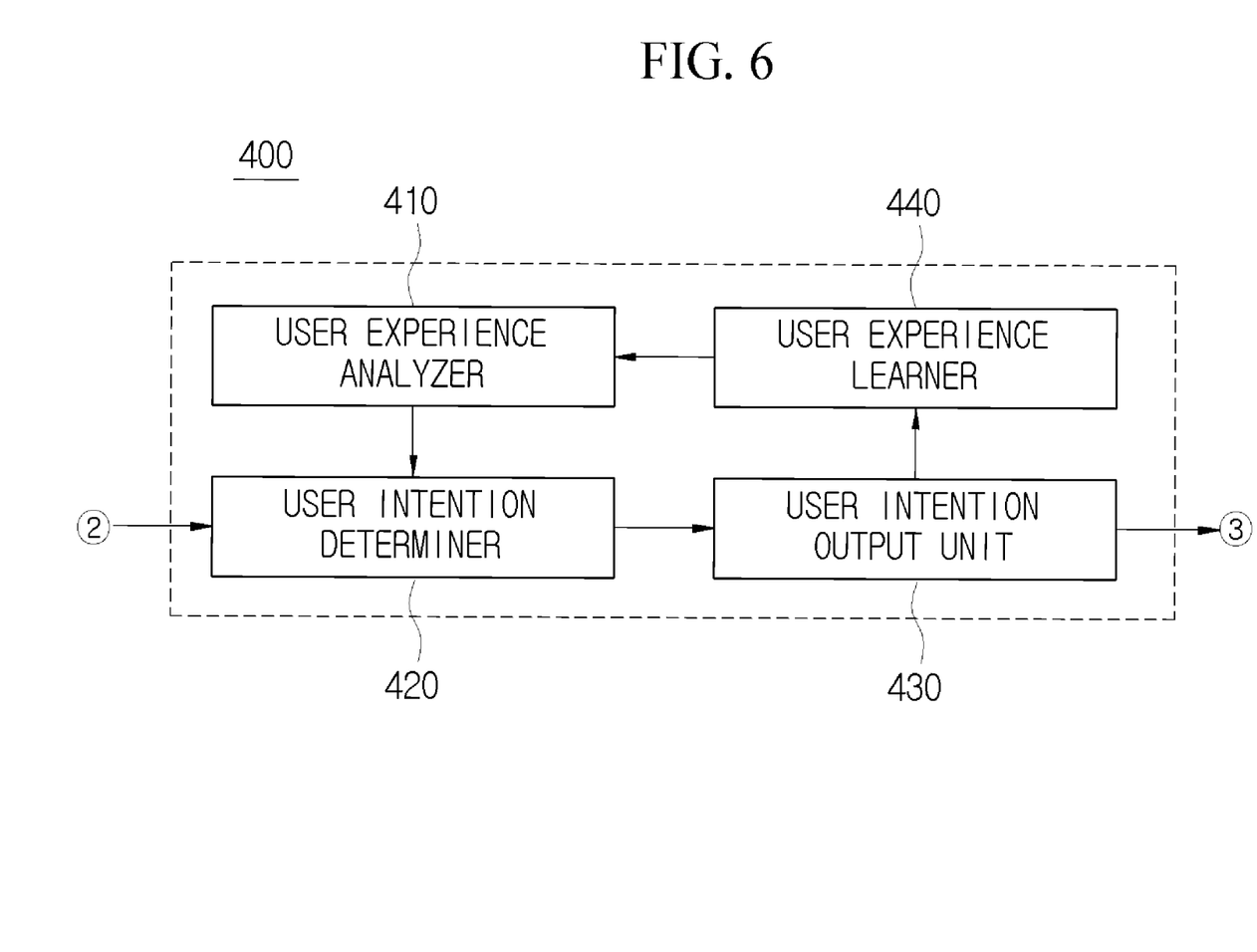
FIG. 6 is a block diagram illustrating a configuration of a user intention recognizer illustrated in FIG. 1.

FIG. 6 is a block diagram illustrating a configuration of the user intention recognizer 400 illustrated in FIG. 1.

Referring to FIG. 6, the user intention recognizer 400 may include a user experience analyzer 410, a user intention determiner 420, a user intention output unit 430, and a user experience learner 440.

The user experience analyzer 410 may store information obtained by analyzing a correlation between a user action pattern and a user intention, based on ontology.

The user intention determiner 420 may determine a user intention corresponding to the user action pattern recognized by the action pattern recognizer 300, based on the correlation between the user action pattern and the user intention analyzed by the user experience analyzer 410.

The user experience learner 440 may learn the correlation between the user intention determined by the user intention determiner 420 and the user action pattern recognized by the action pattern recognizer 300 and may transfer a learned result to the user experience analyzer 410.

Hereinafter, a user intention analysis method based on image information of a 3D space according to an embodiment of the present invention will be described. In the following description, details repetitive of the description of an operation of the user intention analysis apparatus based on image information of a 3D space according to an embodiment of the present invention described above described with reference to FIGS. 1 to 6 are not described.

Figure 7:
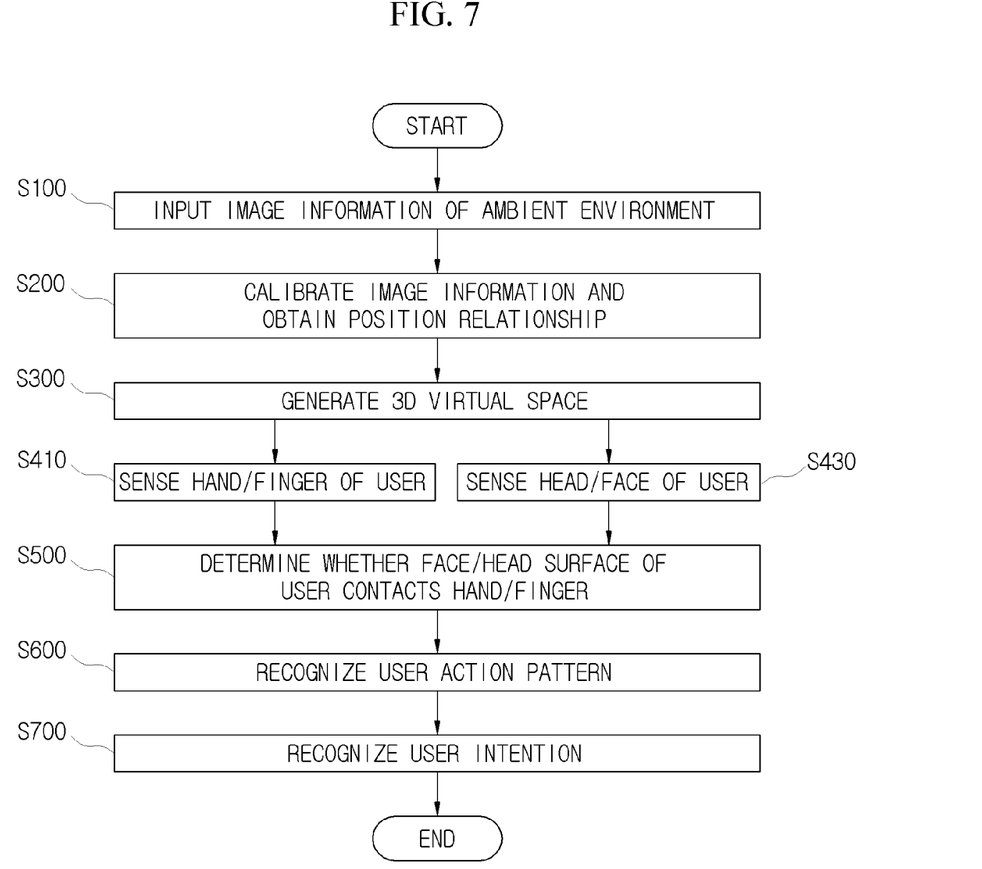
FIG. 7 is a flowchart illustrating a user intention analysis method based on image information of a 3D space, according to an embodiment of the present invention.

FIG. 7 is a flowchart illustrating a user intention analysis method based on image information of a 3D space, according to an embodiment of the present invention.

First, in step S100, the 3D space generator 100 may receive image information generated by photographing an ambient environment of a specific space with a camera.

In step S200, the 3D space generator 100 may obtain physical position relationship information between physical positions of a plurality of cameras generating image information of an ambient environment and devices which are used as landmarks for restoring 3D space coordinates, and may calibrate the image information obtained from the camera, based on the physical position relationship information.

Subsequently, in step S300, the 3D space generator 100 may generate a 3D virtual space corresponding to the ambient environment, based on physical relative positions of the plurality of cameras and image information generated by the cameras photographing the ambient environment.

Subsequently, the 3D image analyzer 200 may estimate relative positions of a hand/finger and a head/face included in the image information in the 3D virtual space in steps S410 and S420, and may generate contact information of the hand/finger and the head/face, based on the relative positions of the hand/finger and the head/face in step S500.

Subsequently, in step S600, the action pattern recognizer 300 may compare the contact information with a pre-learned action pattern to recognize a user action pattern corresponding to the contact information.

Subsequently, in step S700, the user intention recognizer 400 may infer a user intention corresponding to the recognized action pattern, based on ontology.

As described above, according to the embodiments of the present invention, a face of a user is prevented from being occluded by a hand, sunlight, or a shadow when recognizing the face, thereby enhancing a face recognition rate of the user.

Moreover, according to the embodiments of the present invention, an experience of a user may be estimated by analyzing a motion corresponding to a joint level between a hand and a face, thereby analyzing various detailed user intentions.

Moreover, according to the embodiments of the present invention, an experience of a user may be learned by determining whether a hand contacts a face depending on an emotion and situation of the user, based on a 3D model, and thus, a meaningful action is easily analyzed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user intention analysis apparatus based on image information of a three-dimensional (3D) space, the user intention analysis apparatus comprising:
   a 3D space generator configured to generate a 3D virtual space corresponding to an ambient environment, based on physical relative positions of a plurality of cameras and image information generated by photographing the ambient environment with the plurality of cameras;
   a 3D image analyzer configured to estimate a relative position between a first object and a second object included in the image information in the 3D virtual space and generate contact information of the first object and the second object, based on the relative positions of the first object and the second object;
   an action pattern recognizer configured to compare the contact information with a pre-learned action pattern to recognize an action pattern of a user who manipulates the first object or the second object; and
   a user intention recognizer configured to infer a user intention corresponding to the recognized action pattern, based on ontology,
   wherein the 3D image analyzer assigns an identifier (ID) to an arbitrary point or region (hereinafter referred to as a node) of each of a 3D model of the first object and a 3D model of the second object which are obtained by matching a first feature point detected from the first object with a second feature point detected from the second object, and
   wherein the 3D image analyzer compares a predetermined threshold distance with a distance between the nodes to generate contact information of the nodes which is classified into contact, adjacency, and noncontact.

2. The user intention analysis apparatus of claim 1, wherein the 3D image generator generates a 3D virtual space corresponding to a 3D space where a voxel of a 3D space generated by a first camera which photographs the ambient environment in a first direction intersects a voxel of a 3D space generated by a second camera which photographs the ambient environment in a second direction.

3. The user intention analysis apparatus of claim 1, wherein the 3D image analyzer estimates 3D positions of the first object and the second object to detect the first feature point and the second feature point, which are to be used as landmarks and matches the first feature point and the second feature point with a 3D model obtained by modeling the first object and the second object.

4. The user intention analysis apparatus of claim 3, wherein the 3D image analyzer traces positions of the 3D model of the first object and the 3D model of the second object to generate contact information of the first object and the second object.

5. The user intention analysis apparatus of claim 3, wherein the 3D image analyzer generates n-dimensional contact information which includes IDs of corresponding nodes and information about whether the node to which the ID is assigned contacts other nodes.

6. The user intention analysis apparatus of claim 1, wherein the 3D image analyzer comprises:
  a first sensing unit configured to generate first sensing information about an object, based on image information which is obtained by photographing the ambient environment in a first direction;
  a second sensing unit configured to generate second sensing information about the object, based on image information which is obtained by photographing the ambient environment in a second direction;
  a first scanner configured to generate first scan data corresponding to the first object;
  a second scanner configured to generate second scan data corresponding to the second object;
  a first matcher configured to match the first scan data with a feature point which is detected by combining the first and second sensing information and is used as a landmark in the first object;
  a second matcher configured to match the second scan data with a feature point which is detected by combining the first and second sensing information and is used as a landmark in the second object; and
  a contact determiner configured to generate contact information of the 3D model of the first object, which is output as a matched result from the first matcher, and the 3D model of the second object which is output as a matched result from the second matcher.

7. The user intention analysis apparatus of claim 1, wherein the action pattern recognizer comprises:
  a user experience storage configured to store a learned user action pattern;
  an action pattern analyzer configured to classify the learned user action pattern from an n-dimensional vector included in the contact information; and
  an action pattern output unit configured to recognize and output the classified action pattern as a user action pattern corresponding to the contact information.

8. The user intention analysis apparatus of claim 1, wherein the user intention recognizer comprises:
  a user experience analyzer configured to store information obtained by analyzing a correlation between a user action pattern and a user intention, based on ontology;
  a user intention determiner configured to determine a user intention corresponding to the user action pattern recognized by the action pattern recognizer, based on the correlation between the user action pattern and the user intention analyzed by the user experience analyzer; and
  a user experience learner configured to learn the correlation between the user intention determined by the user intention determiner and the user action pattern recognized by the action pattern recognizer and transfer a learned result to the user experience analyzer.

9. A user intention analysis method based on image information of a three-dimensional (3D) space, the user intention analysis method comprising:
  generating a 3D virtual space corresponding to an ambient environment, based on physical relative positions of a plurality of cameras and image information generated by photographing the ambient environment with the plurality of cameras;
  estimating a relative position between a first object and a second object included in the image information in the 3D virtual space to generate contact information of the first object and the second object, based on the relative positions of the first object and the second object;
  comparing the contact information with a pre-learned action pattern to recognize an action pattern of a user who manipulates the first object or the second object; and
  inferring a user intention corresponding to the recognized action pattern, based on ontology,
  wherein the generating of the contact information comprises assigning an identifier (ID) to an arbitrary point or region (hereinafter referred to as a node) of each of a 3D model of the first object and a 3D model of the second object which are obtained by matching a first feature point detected from the first object with a second feature point detected from the second object, and comparing a predetermined threshold distance with a distance between the nodes to generate contact information of the nodes which is classified into contact, adjacency, and noncontact.

10. The user intention analysis method of claim 9, wherein the generating of the 3D virtual space comprises generating a 3D virtual space corresponding to a 3D space where a voxel of a 3D space generated by a first camera which photographs the ambient environment in a first direction intersects a voxel of a 3D space generated by a second camera which photographs the ambient environment in a second direction.

11. The user intention analysis method of claim 9, wherein the generating of the contact information comprises estimating 3D positions of the first object and the second object to detect the first feature point and the second feature point, which are to be used as landmarks and matching the first feature point and the second feature point with a 3D model obtained by modeling the first object and the second object.

12. The user intention analysis method of claim 11, wherein the generating of the contact information comprises tracing positions of the 3D model of the first object and the 3D model of the second object to generate contact information of the first object and the second object.

13. The user intention analysis method of claim 11, wherein the generating of the contact information comprises generating n-dimensional contact information which includes IDs of corresponding nodes and information about whether the node to which the ID is assigned contacts other nodes.

14. The user intention analysis method of claim 9, wherein the generating of the contact information comprises:
  (a) generating first sensing information about an object, based on image information which is obtained by photographing the ambient environment in a first direction;
  (b) generating second sensing information about the object, based on image information which is obtained by photographing the ambient environment in a second direction;
  (c) generating first scan data corresponding to the first object;
  (d) generating second scan data corresponding to the second object;
  (e) matching the first scan data with a feature point which is detected by combining the first and second sensing information and is used as a landmark in the first object;

(f) matching the second scan data with a feature point which is detected by combining the first and second sensing information and is used as a landmark in the second object; and (g) generating contact information of the 3D model of the first object, which is output as a result obtained by matching the first scan data with the feature point detected from the first object, and the 3D model of the second object which is output as a result obtained by matching the second scan data with the feature point detected from the second object.

15. The user intention analysis method of claim 11, wherein step (g) comprises:

assigning an identifier (ID) to an arbitrary point or region of each of the 3D model of the first object and the 3D model of the second object obtained by matching the first feature point with the second feature point; and generating n-dimensional contact information which includes IDs of corresponding nodes and information about whether the arbitrary point or region (hereinafter referred to as a node) to which the ID is assigned contacts other nodes.

16. The user intention analysis method of claim 9, wherein the recognizing of the action pattern comprises:

classifying a learned user action pattern from an n-dimensional vector included in the contact information; and recognizing and outputting the classified action pattern as a user action pattern corresponding to the contact information.

17. The user intention analysis method of claim 9, wherein the inferring comprises:

storing information obtained by analyzing a correlation between a user action pattern and a user intention, based on ontology;

determining a user intention corresponding to the recognized user action pattern, based on the correlation between the user action pattern and the user intention; and learning the correlation between the determined user intention and the recognized user action pattern.

\* \* \* \* \*